J. H. ROBINSON.
SAFETY PIN.
APPLICATION FILED DEC. 27, 1910.

1,030,431.

Patented June 25, 1912.

Witnesses

Inventor
James H. Robinson
By
Attorney

UNITED STATES PATENT OFFICE.

JAMES HENRY ROBINSON, OF LEWISTON, IDAHO, ASSIGNOR OF ONE-HALF TO FRANCES M. MOXLEY, OF LEWISTON, IDAHO.

SAFETY-PIN.

1,030,431.      Specification of Letters Patent.      Patented June 25, 1912.

Application filed December 27, 1910. Serial No. 599,553.

*To all whom it may concern:*

Be it known that I, JAMES H. ROBINSON, a citizen of the United States, residing at Lewiston, in the county of Nez Perce and State of Idaho, have invented certain new and useful Improvements in Safety-Pins, of which the following is a specification.

This invention relates to safety pins designed for various purposes, and one of the principal objects of the invention is to provide means for preventing the bending of the pin member in use and also for preventing the accidental removal of the point of the pin from the guard.
Another object of the invention is to provide a safety pin preferably made from a single strand of wire and provided with a lock or guard disposed centrally or at various points between the spring of the pin and the guard for the point of the pin, said lock serving to prevent the bending of the pin member and also for preventing the accidental disconnection of the point of the pin from the guard.
Still another object of the invention is to provide a safety pin for use in securing the flaps of tents together, said safety pin comprising a hook upon one member and an eye upon the other, each of said members being provided with a lock disposed at a point between the spring and the pin point for giving additional strength to the pin member and for preventing accidental detachment.
Another object of the invention is to provide a pin having a pair of eyes connected to the back member and a chain or other flexible device connected to one of the eyes and adapted to be detachably connected to the other, said device being adapted for use as a bed clothes fastener for nurseries, hospitals, and other places.

Figure 1:
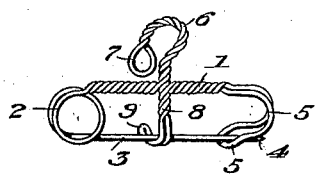
Figure 2:
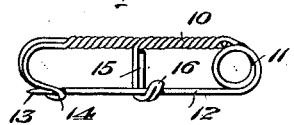
Figure 3:
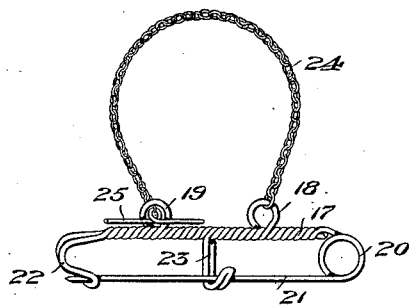

These and other objects may be attained by means of the construction illustrated in the accompanying drawing in which:

Figure 1 is a perspective view of a safety pin made in accordance with my invention and provided with a hook extending from the back member of the pin and said hook adapted to be used with an eye member of similar construction for various purposes. Fig. 2 is a perspective view of a safety pin made in accordance with my invention and provided with a central lock or reinforcing guard. Fig. 3 is a perspective view of a safety pin adapted for use as a bed clothes fastener.

Referring to the accompanying drawing, and more especially to Fig. 1 of the drawing, the numeral 1 designates the back member of the pin which is made from a single strand of wire doubled together and twisted to give additional strength to this part. The numeral 2 designates the coils forming the spring for the pin member 3, which is provided with a pin 4, as is usual with safety pins. The guard 5 is formed of two members or strands bent in the form of a loop through which the pin point 4 extends. Formed on the back member 1 is a hook 6 of twisted wire, said hook terminating in a loop 7. Extending oppositely from the hook 6 is a lock member 8 having an upwardly extending bill 9 which engages the pin member 3 at a point nearly central between the coils 2 and the guard 5. It will be obvious, however, that any suitable number of the locking members 8 may be utilized, depending upon the use to which the safety pin may be put.

Referring to Fig. 2, the back member 10 is twisted as shown in Fig. 1 and extending from the back is a series of coils 11 terminating in a pin member 12, provided with a point 13. The guard member 14 is substantially identical with that shown in Fig. 1. The guard member 15 is shown in Fig. 2 as comprising parallel strands terminating in a bill 16.

The bed clothes fastener shown in Fig. 3 comprises a back member 17 having a pair of loops 18 and 19 formed thereon. A coil spring 20 is formed on one end of the back and terminates in a pin 21. The guard 22 is formed on the opposite end of the back.
The lock or reinforcing device 23 is connected centrally to the back 17 and supports the pin 21 in line with the lower portion of the coil 20. A chain 24 is connected to the eye 18 and upon the opposite end of the chain is a cross bar 25 which is pivoted to the chain and adapted to be detachably connected to the eye 19. This device is designed to be connected to the bed clothes while the chain 24 is passed around a bed post or other suitable portion of a bedstead.

From the foregoing it will be obvious that a safety pin made in accordance with my invention may be used for many purposes and that, owing to the lock or reinforcing member, the pin member is not liable to become bent or detached accidentally from its guard.

My invention may be manufactured at low cost, is simple in construction, is durable and is safe from accidental disconnection.

I claim:

A safety pin made from a single length of wire doubled together and twisted to form a rigid back member with two loops, each formed of a single twist of wire extending upwardly therefrom, one near each end thereof, said loops having their horizontal diameters extending in the same direction as the back, a coiled spring formed integral with one end of said back, a pin extending from said spring and integral therewith, said pin extending the length of said back, a guard member integral with the back and at the opposite end thereof from the spring, a centrally-disposed lock or guard for said pin comprising parallel members terminating in a hook, said lock or guard extending downwardly from said back and integral therewith, and a chain provided with a pivoted cross-bar upon one end thereof, the opposite end of said chain being permanently attached to the loop nearest the spring, said pivoted cross bar adapted to be detachably connected to the other loop.

In testimony whereof I affix my signature in presence of two witnesses.

JAMES HENRY ROBINSON.

Witnesses:
  THOS. J. BEALL,
  S. A. COPPINGER.

---

Copies of this patent may be obtained for five cents each, by addressing the "Commissioner of Patents, Washington, D. C."